(12) United States Patent
Bhan (10) Patent No.: US 8,530,373 B2
(45) Date of Patent: Sep. 10, 2013

(54) CATALYST AND PROCESS FOR THE MANUFACTURE OF ULTRA-LOW SULFUR DISTILLATE PRODUCT

(75) Inventor: Opinder Kishan Bhan, Katy, TX (US)

(73) Assignee: Shell Oil Company, Houston, TX (US)

(*) Notice: Subject to any disclaimer, the term of this patent is extended or adjusted under 35 U.S.C. 154(b) by 0 days.

(21) Appl. No.: 12/831,335

(22) Filed: Jul. 7, 2010

(65) Prior Publication Data

US 2011/0124497 A1    May 26, 2011

Related U.S. Application Data

(62) Division of application No. 11/832,467, filed on Aug. 1, 2007, now Pat. No. 7,824,541.

(60) Provisional application No. 60/821,342, filed on Aug. 3, 2006.

(51) Int. Cl.
*B01J 27/19* (2006.01)

(52) U.S. Cl.
USPC .............. 502/315; 502/313; 502/337

(58) Field of Classification Search
USPC ................ 502/313–315, 326, 337
See application file for complete search history.

(56) References Cited

U.S. PATENT DOCUMENTS

| 4,402,865 | A | 9/1983 | Blakely | 252/432 |
|---|---|---|---|---|
| 4,443,558 | A | 4/1984 | Gibson | 502/314 |
| 4,846,961 | A * | 7/1989 | Robinson et al. | 208/216 PP |
| 4,886,582 | A * | 12/1989 | Simpson | 502/211 |
| 4,888,316 | A | 12/1989 | Gardner et al. | 502/20 |
| 5,006,496 | A | 4/1991 | Huizinga et al. | 502/61 |
| 5,280,004 | A * | 1/1994 | Iino et al. | 502/314 |
| 5,686,375 | A | 11/1997 | Iyer et al. | 502/315 |
| 5,827,421 | A | 10/1998 | Sherwood, Jr. | 208/112 |
| 6,030,915 | A | 2/2000 | De Boer | 520/39 |

FOREIGN PATENT DOCUMENTS

| GB | 2055602 | 3/1981 |
|---|---|---|
| GB | 2118062 | 10/1983 |
| GB | 2118063 | 10/1983 |
| JP | 1208330 | 8/1989 |
| JP | 2026642 | 2/1990 |
| JP | 2003010682 | 1/2003 |
| JP | 2003230837 | 8/2003 |
| JP | 2003299960 | 10/2003 |
| JP | 2005169232 | 6/2005 |
| JP | 2005230622 | 9/2005 |
| JP | 2005314657 | 11/2005 |
| JP | 2006000726 | 1/2006 |
| WO | WO0232570 | 4/2002 |

* cited by examiner

*Primary Examiner* — Brian McCaig
(74) *Attorney, Agent, or Firm* — Charles W. Stewart (57) ABSTRACT

Described is a catalyst and process useful in the hydrodesulfurization of a distillate feedstock to manufacture a low-sulfur distillate product. The catalyst comprises a calcined mixture of inorganic oxide material, a high concentration of a molybdenum component, and a high concentration of a Group VIII metal component. The mixture that is calcined to form the calcined mixture comprises molybdenum trioxide, a Group VIII metal compound, and an inorganic oxide material. The catalyst is made by mixing the aforementioned starting materials and forming therefrom an agglomerate that is calcined to yield the calcined mixture that may be used as the catalyst or catalyst precursor.

35 Claims, 1 Drawing Sheet

CATALYST AND PROCESS FOR THE MANUFACTURE OF ULTRA-LOW SULFUR DISTILLATE PRODUCT

This application is a divisional application of application Ser. No. 11/832,467, filed Aug. 1, 2007, which issued as U.S. Pat. No. 7,824,541, and which claims the benefit of U.S. Provisional Application No. 60/821,342, filed Aug. 3, 2006.

This invention relates to a catalyst and process for the manufacture of a hydrocarbon product having a low sulfur concentration. The invention further relates to a process for the manufacture of an ultra-low sulfur distillate product and a distillate hydrodesulfurization catalyst for use in such process.

U.S. governmental regulations are imposing more severe limits on the maximum sulfur concentration permitted for on-road diesel with the maximum sulfur concentration limit currently being set at 15 parts per million (ppm). The European Union has set a sulfur concentration limit for diesel fuel of less than 50 ppm. Other organizations are supporting even stricter requirements of as low as 5 to 10 ppm sulfur in diesel. Due to these low sulfur concentration limits, there are ongoing efforts by industry to develop improved distillate hydrodesulfurization catalysts that may suitably be used in the hydrodesulfurization of distillate feedstocks that contain sulfur high concentrations to produce low sulfur distillate products.

A typical prior art hydroprocessing catalyst is disclosed in U.S. Pat. No. 5,223,472 (Simpson et al.), which teaches that its hydroprocessing catalyst is an alumina support impregnated with a Group VIII metal and a Group VIB metal. The catalyst is said to be characterized by a relatively narrow pore size distribution and containing from 0.1 to 5.0 weight percent of a Group VIII metal and from 2.0 to 10.0 weight percent of a Group VIB metal. The preferred catalyst is made by impregnating formed support particles by using an impregnation solution containing dissolved metal hydrogenation components. If a Group VIB metal component is desired in the final catalyst, the Group VIB metal compounds that may be used in the impregnation solution are chosen from those that are soluble in aqueous media, including salt compounds that contain the Group VIB metal. There is no mention in the patent of the incorporation of a molybdenum hydrogenation component into a hydroprocessing catalyst by the comulling of molybdenum trioxide with the inorganic support material.

U.S. Pat. No. 5,686,375 (Iyer et al.) mentions hydroprocessing catalysts that contain underbedded Group VIII metal components with the preferred catalyst comprising underbedded nickel and an overlayer of molybdenum. The patent states that many nickel and molybdenum compounds are useful for impregnation or comulling including precursors of molybdenum trioxide, but it does not specifically mention the comulling of molybdenum trioxide with the porous refractory support material in the preparation of its catalyst support that has an underbedded molybdenum component. The patent does, however, mention the incorporation of molybdenum onto the support that contains underbedded nickel by comulling instead of by impregnation. But, there is no teaching in the '375 patent of the preparation of a hydrotreating catalyst for making ultra-low sulfur distillate by the comulling of an inorganic support material with both a molybdenum trioxide and a Group VIII metal compound followed by the resulting mixture being calcined to thereby form the catalyst.

Disclosed in U.S. Pat. No. 4,888,316 (Gardner et al.) is a hydrotreating catalyst made from spent hydrotreating catalyst that comprises molybdenum and/or tungsten and/or nickel and/or cobalt. The spent catalyst is subjected to a grinding step whereby it is ground to a suitable particle size. The ground spent hydrotreating catalyst is mixed with alumina material and formed into shaped particles that are calcined to give the hydrotreating catalyst. There is no mention in the patent of the incorporation of a molybdenum hydrogenation component into a hydroprocessing catalyst by the comulling of molybdenum trioxide with the inorganic support material.

Intl. Pub. No. WO 02/32570 (Bhan) discloses a hydroprocessing catalyst made by mixing alumina with fines produced by crushing a commercial hydroprocessing catalyst that contains a Group VIB metal and, optionally, a Group VIII metal, and forming the resulting mixture into particles, preferably by extrusion, followed by calcination of the formed particles. A suitable amount of Group VIB metal in the finished catalyst is from 0.5 wt. % to 10 wt. % of the catalyst, with in the case of molybdenum, between 2 wt. % and 6 wt. % being preferred. There is no mention in the patent of the incorporation of a molybdenum hydrogenation component into a hydroprocessing catalyst by the comulling of molybdenum trioxide with the inorganic support material or that it is undesirable to comull a molybdenum salt with the inorganic support material.

U.S. Pat. No. 6,030,915 (de Boer) discloses a hydroprocessing catalyst that uses regenerated spent hydroprocessing catalyst fines in the manufacture of a hydroprocessing catalyst. The patent further indicates that additional hydrogenation metals may be added to the catalyst composition by impregnation using an impregnation solution comprising water soluble salts of the hydrogenation metals to be incorporated into the catalyst composition. Also, an alternative method of incorporating the extra metal into the catalyst composition is indicated as including the mixing of either solid state or dissolved metal components with the mixture of regenerated spent hydroprocessing catalyst fines, binder, and, optionally, additive. The solid state metal may include solid molybdenum oxide. The '915 patent requires the regenerated spend hydroprocessing catalyst fines to be mixed with at least one additive, which may include a binder, in the preparation of its catalyst.

It is desirable to have a catalyst that has a low production cost and which is useful in the hydrodesulfurization of a sulfur-containing distillate feedstock to yield an ultra-low sulfur distillate product. It is further desirable for the hydroprocessing catalyst to have good sulfur removal activity and to be highly stable by exhibiting a low rate of decline in its sulfur removal activity.

Thus, accordingly, provided is a composition for use as a distillate hydrodesulfurization catalyst in the manufacture of an ultra-low sulfur distillate product, wherein said composition comprises: a calcined mixture made by calcining a mixture comprising an inorganic oxide material, molybdenum trioxide, and a Group VIII metal compound selected from the group consisting of a nickel compound and a cobalt compound, wherein said calcined mixture has a molybdenum content in the range of from 7 weight percent to 22 weight percent with the weight percent being based upon the molybdenum as metal and the total weight of the calcined mixture, and a Group VIII metal content in the range of from 3 weight percent to 12 weight percent with the weight percent being based upon the Group VIII metal in its elemental form and the total weight of the calcined mixture.

Also provided is a process for making an ultra-low sulfur distillate product, wherein said process comprises: contacting, under suitable distillate desulfurization process conditions, a distillate feedstock, wherein said distillate feedstock comprises a first sulfur concentration, with a distillate hydrodesulfurization catalyst comprising a calcined mixture made by calcining a formed particle of a mixture comprising molybdenum trioxide, a nickel compound, and an inorganic oxide material, wherein said distillate hydrodesulfurization catalyst comprises from 7 to 22 weight percent molybdenum, as metal and based on the total weight of said distillate hydrodesulfurization catalyst, and more than 3 weight percent nickel, as metal and based on the total weight of said distillate hydrodesulfurization catalyst; and yielding said ultra-low sulfur distillate product having a second sulfur concentration.

Still, further provided is a method of making a composition for use as a distillate hydrodesulfurization catalyst in the manufacture of an ultra-low sulfur distillate product, wherein said method comprises: co-mulling an inorganic material, molybdenum trioxide powder, and a nickel compound to form a mixture; forming said mixture into a particle; and calcining said particle to provide a calcined mixture, wherein said calcined mixture has a molybdenum content in the range of from 7 weight percent to 22 weight percent with the weight percent being based upon the molybdenum as metal and the total weight of the calcined mixture, and a Group VIII metal content in the range of from 3 weight percent to 12 weight percent with the weight percent being based upon the Group VIII metal in its elemental form and the total weight of the calcined mixture.

A novel catalyst composition has been discovered that is especially useful in the hydrodesulfurization of a distillate feedstock that has a high sulfur concentration to make a distillate product having an ultra-low sulfur concentration. This catalyst has a particularly high sulfur removal activity; and, also, the catalyst is highly stable in that it exhibits a low rate of decline in its catalytic activity for sulfur removal when used in such an application. The catalyst further has a low cost to produce as compared to other hydroprocessing catalysts in that there are fewer required manufacturing steps than are typically needed to produce certain of the prior art catalysts.

The inventive catalyst that is effective in the hydrodesulfurization of a distillate feedstock is, in general, a calcined mixture including an inorganic oxide material, a high concentration of a molybdenum component, and a high concentration of a Group VIII metal component. It is essential that the mixture that is to be calcined to form the calcined mixture include molybdenum trioxide, a Group VIII metal compound and an inorganic oxide material. It is preferred for the mixture to be first formed into a particle that is then calcined to provide the calcined mixture. As noted, the calcined mixture is to have a high concentration of a molybdenum component, which is present in the calcined mixture in an amount in the range of from 7 weight percent to 22 weight percent with the weight percent being based upon the molybdenum as metal and the total weight of the calcined mixture, and a high concentration of a Group VIII metal component, which is present in the calcined mixture in an amount in the range of from 3 weight percent to 12 weight percent with the weight percent being based upon the Group VIII component as metal and the total weight of the calcined mixture.

An important aspect of the invention is for the mixture from which the particle is formed to be made using molybdenum trioxide that is, preferably, in the form of finely defined particles that may include a dry powder or as a suspension or slurry of the finely defined particles, as the source of molybdenum instead of using other molybdenum compounds that are in a form other than molybdenum trioxide, such as salts of molybdenum. Therefore, the mixture that is formed into a shaped particle, and thereafter calcined, comprises a substantial absence of a molybdenum compound that is in a form other than as molybdenum trioxide, such as, for example, a molybdenum salt compound.

What is meant herein when referring to the substantial absence of a molybdenum compound in a form other than as molybdenum trioxide is that the mixture that is shaped or formed into a formed particle and thereafter calcined under suitable calcination conditions, as more fully described elsewhere herein, contains less than a small or less than a negligible amount of a molybdenum compound other than molybdenum trioxide, such as, for example, a molybdenum salt compound or an inorganic molybdenum compound. Examples of molybdenum compounds other than molybdenum trioxide include ammonium molybdate, ammonium dimolybdate, ammonium heptamolybdate, molybdenum acetate, molybdenum bromide, molybdenum chloride, molybdenum sulfide, and molybdenum carbide. It is, thus, desirable for the mixture to contain less than 2 weight percent, based on the total dry weight of the mixture, of a molybdenum compound other than molybdenum trioxide. It is preferred for the mixture to contain less than 1 weight percent of a molybdenum compound other than molybdenum trioxide, and, most preferred, less than 0.5 weight percent.

In another embodiment of the invention, the mixture may consist essentially of molybdenum trioxide, a Group VIII metal (particularly, nickel or cobalt) compound, and an inorganic oxide material. As the phrase "consist essentially of", or other similar phraseology, is used herein in defining the elements or components that make up the mixture, what is meant is that a material amount of any molybdenum compound other than molybdenum trioxide is excluded from the mixture. This phrase, however, is not intended to mean that excluded from the recited components of the mixture are material amounts of other compounds such as promoter components including phosphorous compounds. A material amount of a molybdenum compound other than molybdenum trioxide is an amount of such compound contained in the mixture that provides for a material affect upon the catalytic performance properties of the final catalyst. These catalyst performance properties are discussed in detail elsewhere herein.

The amount of molybdenum trioxide that is contained in the mixture should be such as to provide for the final calcined mixture having a molybdenum content in the range of from 7 weight percent to 22 weight percent, as metal, (10.5 to 18 wt. %, based on $MoO_3$), with the weight percent being based on the total weight of the calcined mixture. However, it is desirable for the amount of molybdenum trioxide that is contained in the mixture to be such as to provide for the final calcined mixture having molybdenum content in the range of from 10 to 20 wt. %, as metal (15 to 30 wt. %, as oxide), but, preferably, from 12 to 18 wt. % (18 to 27 wt. %, as oxide), and, most preferably, from 14 to 16 wt. % (21 to 24 wt. %, as oxide).

In addition to the molybdenum trioxide component, the mixture further contains a Group VIII metal compound. It is preferred for the Group VIII metal compound to be selected from the group of compounds consisting of nickel compounds and cobalt compounds, and, among these, the most preferred are nickel compounds.

The source of the Group VIII component may be selected from any suitable Group VIII compound that is capable of being mixed with the other components of the mixture and to be shaped into a particle that is to be calcined to form the final calcined mixture. The Group VIII compounds may include, for example, hydroxides, nitrates, acetates, and oxides of a Group VIII metal.

The amount of Group VIII compound that is contained in the mixture should be such as to provide for the final calcined mixture having a Group VIII metal content in the range of from 3 weight percent, as metal, (if nickel, 3.82 wt. %, as NiO) to 12 weight percent, as metal, (if nickel, 15.3 wt. %, as NiO), with the weight percent being based on the total weight of the calcined mixture. However, it is desirable for the amount of the Group VIII metal that is contained in the mixture to be such as to provide for the final calcined mixture having Group VIII metal content in the range of from 4 wt. %, as metal, (if nickel, 5.1 wt. %, as NiO) to 11 wt. %, as metal (if nickel, 14 wt. %, as NiO), but, preferably, from 4.5 wt. % (if nickel, 5.7 wt. %, as NiO) to 10.5 wt. % (if nickel, 13.4 wt. %, as NiO), and, most preferably, from 5 wt. % (if nickel, 6.4 wt. %, as NiO) to 10 wt. % (if nickel, 12.7 wt. %, as NiO).

In addition to the molybdenum trioxide component and the Group VIII metal compound, the mixture further includes an inorganic oxide material. Any suitable porous inorganic refractory oxide that will provide the surface structure properties required for the inventive catalyst may be used as the inorganic oxide material component of the mixture. Examples of possible suitable types of porous inorganic refractory oxides include silica, alumina, and silica-alumina. Preferred are alumina and silica-alumina.

The amount of inorganic oxide material that is contained in the mixture is such as to provide an amount in the range of from 50 to 90 weight percent inorganic oxide material in the final calcined mixture with the weight percent being based on the total weight of the calcined mixture. Preferably, the amount of inorganic oxide material in the calcined mixture is in the range of from 55 to 88 weight percent, and, most preferably, from 60 to 86 weight percent.

In addition to the requirement that the source of the molybdenum component of the inventive catalyst is to be predominantly provided by molybdenum trioxide, the surface characteristics of the inventive catalyst in combination with the specifically defined metal loadings and other catalyst attributes provide for a catalyst that is especially useful in the hydrodesulfurization of a distillate feedstock having a concentration of sulfur in order to yield a distillate product having an ultra-low sulfur concentration. One such surface characteristic important to the performance of the inventive catalyst is that it has a mean pore diameter that is within a specific and narrow range, and, further, that it has a small percentage of the total pore volume contained within the macropores. Also, in order to provide for the desired catalytic properties, the mean pore diameter of the pores of the inventive catalyst is, in general, in the range of from 50 angstroms (Å) to 100 Å. Preferably, the mean pore diameter of the pores is in the range of from 60 to 95 angstroms, and, most preferably, from 70 to 90 angstroms.

In addition to having the specific and narrow range of mean pore diameter as discussed above, the inventive catalyst is to have a small percentage of the total pore volume that is contained within the macropores of the inventive catalyst. The term macropore is defined as being those pores having pore diameters greater than 350 angstroms. It is desirable for the inventive catalyst to have less than 4.5 percent of its total pore volume contained within the macropores, but, preferably, less than 4 percent, and, most preferably, less than 3.5 percent. Also, it is desirable for the pore structure of the inventive catalyst to be such that less than 1 percent of the total pore volume to be contained within its macropores having a diameter greater than 1000 angstroms, and it is more desirable that less than 0.9 percent of the total pore volume to be contained within the macropores having a diameter greater than 1000 angstroms, and, most desirable, less than 0.8 percent of the total pore volume to be contained within the macropores having a diameter greater than 1000 angstroms A further important property of the inventive catalyst is for it to have a significantly high surface area. It is the particular combination of a significantly high surface area in combination with the narrow distribution of pore diameters and the use of the molybdenum trioxide as the molybdenum source in the manufacture of the inventive catalyst that contributes to many of the important performance properties of the inventive catalyst. It is desirable for the inventive catalyst to have a reasonably high surface area that exceeds 250 $m^2/g$. Preferably, the surface area of the inventive catalyst exceeds 275 $m^2/g$, and, most preferably, it exceeds 300 $m^2/g$.

It has been found that the inventive method provides for the novel catalyst that, as earlier noted, exhibits particularly good properties when it is used in the hydrodesulfurization of a distillate hydrocarbon feedstock that contains a concentration of sulfur. While it is not known with certainty, it is nevertheless believed that many of the beneficial catalytic properties of the inventive catalyst are associated with the novel method of manufacturing the inventive catalyst and, also, in the use of molybdenum trioxide as the principal source of the molybdenum component of the catalyst, as opposed to the use of alternative molybdenum sources in such manufacturing. It is surmised that the reason for this is in someway associated with molybdenum trioxide having acidic and other unique properties such that when it is combined with the alumina it more effectively incorporates and disperses itself within the alumina matrix. In fact, an examination of certain scan electron micrographs of the inventive catalyst that has been sulfided suggests that there is a significantly lower degree of molybdenum disulfide ($MoS_2$) slab stacking with the stacks having reduced heights and lengths as compared to alternative molybdenum-containing hydroprocessing catalysts.

The inventive method for making the catalyst of the invention provides for a more economical approach to manufacturing a hydrotreating catalyst as compared to many of the prior art manufacturing methods. The novel method involves a single step for mixing the catalyst components to thereby incorporate the hydrogenation metals and promoters into the mixture in such single step. Many of the prior art methods, on the other hand, use multiple steps to incorporate the catalytic components into the compositions, such as, for example, by first preparing the support structure followed by separate impregnation steps. Indeed, it is undesirable for the inventive method to include the use of a molybdenum salt or a solution thereof for the incorporation of the molybdenum component into the inventive catalyst. Typically, the prior art teaches the use of a molybdenum salt solution to incorporate molybdenum into the support structure of a catalyst. Thus, the inventive method can be more economical than many of the prior art manufacturing methods in that it eliminates some of the catalyst manufacturing processing steps.

Another of the advantages provided by the inventive method of making the inventive distillate hydrodesulfurization catalyst is that it allows for the uniform incorporation of a high concentration of metals that is required for the distillate hydrodesulfurization catalyst to have the catalytic properties necessary to provide for the ultra-low sulfur distillate product and other benefits. The catalyst of the invention is required to have a high concentration of a molybdenum component and a high concentration of a Group VIII metal component. Typical impregnation techniques used to incorporate hydrogenation metals into a support material to make a hydroprocessing catalyst normally do not allow for the incorporation of high concentration levels of the metals, and, especially when the support particles are particularly large in size, the impregnation techniques do not allow for the incorporation of a uniformly high concentration of the hydrogenation metals in the support particles. The inventive method as described herein, on the other hand, can provide for the incorporation of a uniformly high concentration of molybdenum and Group VIII metal components into the catalyst shapes of the catalyst to thereby overcome some of the problems associated with the use of typical impregnation techniques for incorporating metals into catalyst support particles.

The inventive method for making the catalyst of the invention includes the mixing or co-mulling of the appropriate starting materials to form a mixture that is formed or agglomerated into particles that are then calcined to thereby provide a calcined mixture. The calcined mixture itself may be used as the highly stable hydrodesulfurization catalyst or it may be activated prior to or during its use by any number of known methods including treatment with hydrogen or with sulfur or sulfur compounds, such as, elemental sulfur, hydrogen sulfide or an organic sulfur compound.

The first step of the inventive method includes combining the starting materials of the catalyst to form a mixture. The essential starting materials in the preparation of the mixture include molybdenum trioxide that is preferably in powder form and an inorganic oxide material, such as, inorganic oxide material selected from the group consisting of alumina, silica and alumina-silica. Also, a Group VIII metal component, preferably either a cobalt component or a nickel component, and more preferably, a nickel component, may further be combined with the molybdenum trioxide and inorganic oxide material in the formation of the mixture. The Group VIII metal component may be any suitable source of Group VIII metal including Group VIII metal salt compounds, both dry or dissolved in solution, or any other Group VIII metal compound including those mentioned above.

The formation of the mixture may be done by any method or means known to those skilled in the art, including, but not limited to, the use of such suitable types of solids-mixing machines as tumblers, stationary shells or troughs, Muller mixers, which are either batch type or continuous type, and impact mixers, and the use of such suitable types of either batch-wise or continuous mixers for mixing solids and liquids or for the formation of paste-like mixtures that are extrudable. Suitable types of batch mixers include, but are not limited to, change-can mixers, stationary-tank mixers, double-arm kneading mixers that are equipped with any suitable type of mixing blade. Suitable types of continuous mixers include, but are not limited to, single or double screw extruders, trough-and-screw mixers and pug mills.

The mixing of starting materials of the catalyst may be conducted during any suitable time period necessary to properly homogenize the mixture. Generally, the blending time may be in the range of upwardly to 2 or 3 hours.

The term "co-mulling" is used broadly in this specification to mean that at least the recited starting materials are mixed together to form a mixture of the individual components of the mixture that is preferably a substantially uniform or homogeneous mixture of the individual components of such mixture. This term is intended to be broad enough in scope to include the mixing of the starting materials so as to yield a paste that exhibits properties making it capable of being extruded or formed into extrudate particles by any of the known extrusion methods. But, also, the term is intended to encompass the mixing of the starting materials so as to yield a mixture that is preferably substantially homogeneous that is capable of being agglomerated into formed particles, such as, spheroids, pills or tablets, cylinders, irregular extrusions or merely loosely bound aggregates or clusters, by any of the methods known to those skilled in the art, including, but not limited to, molding, tableting, pressing, pelletizing, extruding, and tumbling.

As already noted, it is an important aspect of the inventive method for at least a major portion of the molybdenum source of the catalyst to be predominantly molybdenum trioxide. In the mixing or co-mulling of the starting materials of the catalyst, it is preferred for the molybdenum trioxide to be in a finely divided state either as a finely powdered solid or as a suspension. It is best for the particle sizes of the particulate molybdenum trioxide used in the manufacture of the catalyst to have a maximum dimension of less than 0.5 mm 500 microns ($\mu m$)), preferably, a maximum dimension of less than 0.15 mm (150 $\mu m$), more preferably, less than 0.1 mm (100 $\mu m$), and, most preferably, less than 0.075 mm (75 $\mu m$).

While it is not known with certainty, it is believed that it is advantageous to the invention for the molybdenum trioxide that is used in the manufacture of the inventive catalyst to be in the form of as small particles as is practically possible; so, therefore, it is not desired to have a lower limit on the size of the molybdenum particles used in the catalyst manufacture. However, it is understood that the particle size of the molybdenum trioxide used in the manufacture of the catalyst can have a lower limit to its size of greater than 0.2 $\mu m$. Thus, the particle size of the molybdenum trioxide used in the formation of the mixture in the manufacture of the inventive catalyst is preferably in the range of from 0.2 to 150 $\mu m$, more preferably, from 0.3 to 100 $\mu m$, and, most preferably, from 0.5 to 75 $\mu m$. Typically, the size distribution of the molybdenum trioxide particles, whether in a dry powder or a suspension or otherwise, is such that at least 50 percent of the particles have a maximum dimension in the range of from 2 to 15 $\mu m$.

Once the starting materials of the catalyst are properly mixed and formed into particles, a drying step may advantageously be used for removing certain quantities of water or volatiles that are included within the mixture or formed particles. The drying of the particles may be conducted at any suitable temperature for removing excess water or volatiles, but, preferably, the drying temperature will be in the range of from about 75° C. to 250° C. The time period for drying the particles is any suitable period of time necessary to provide for the desired amount of reduction in the volatile content of the particles prior to the calcination step.

The dried or undried particles are calcined in the presence of an oxygen-containing fluid, such as air, at a temperature that is suitable for achieving a desired degree of calcination. Generally, the calcination temperature is in the range of from 450° C. (842° F.) to 760° C. (1400° F.). The temperature conditions at which the particles are calcined can be important to the control of the pore structure of the final calcined mixture. Due to the presence of the molybdenum trioxide in the formed particles, the calcination temperature required to provide for a calcined mixture having the required pore structure is higher than typical temperatures required to calcine other compositions containing inorganic oxide materials, especially those that do not contain molybdenum trioxide. But, in any event, the temperature at which the particles are calcined to provide the finally calcined mixture is controlled so as to provide the finally calcined mixture having the pore structure properties as described in detail herein. The preferred calcination temperature is in the range of from 510° C. (950° F.) to 730° C. (1346° F.), and, most preferably, from 540° C. (1004° F.) to 705° C. (1301° F.).

The catalyst of the invention, i.e., the calcined mixture, is particularly suitable for use in a process for the hydrodesulfurization of a middle distillate hydrocarbon feedstock, having a concentration of sulfur or sulfur compounds, in order to make a low sulfur middle distillate hydrocarbon product. More specifically, the catalyst may be used in a process for the manufacture of an ultra-low sulfur distillate product, such as an ultra-low sulfur diesel product, having a sulfur concentration of less than 50 ppmw, preferably, less than 25 ppmw, more preferably, less than 15 ppmw, and most preferably, less than 10 ppmw.

The distillate feedstock as referred to herein is intended to include refinery hydrocarbon streams having boiling temperatures at atmospheric pressure in the range of from about 140° C. (284° F.) to about 410° C. (770° F.). These temperatures are approximate initial and final boiling temperatures of the distillate feedstock. Examples of the refinery streams intended to be included within the meaning of the term distillate feedstock include straight run distillate fuels boiling in the referenced boiling range, such as kerosene, jet fuel, light diesel oil, heating oil, and heavy diesel oil, and the cracked distillates, such as FCC cycle oil, coker gas oil, and hydrocracker distillates. The preferred feedstock of the inventive process is a middle distillate boiling in the diesel boiling range of from about 140° C. (284° F.) to about 400° C. (752° F.).

The sulfur concentration of the middle distillate feedstock can be a high concentration, for instance, being in the range upwardly to about 2 weight percent of the distillate feedstock based on the weight of elemental sulfur and the total weight of the distillate feedstock inclusive of the sulfur compounds. Typically, however, the distillate feedstock of the inventive process has a sulfur concentration in the range of from 0.01 wt. % (100 ppmw) to 1.8 wt. % (18,000). But, more typically, the sulfur concentration is in the range of from 0.1 wt. % (1000 ppmw) to 1.6 wt. % (16,000 ppmw), and, most typically, from 0.18 wt. % (1800 ppmw) to 1.1 wt. % (11,000 ppmw). It is understood that the references herein to the sulfur content of the distillate feedstock are to those compounds that are normally found in a distillate feedstock or in the hydrodesulfurized distillate product and are chemical compounds that contain a sulfur atom and which generally include organosulfur compounds.

The calcined mixture (catalyst) of the invention may be employed as a part of any suitable reactor system that provides for the contacting of the inventive catalyst with the distillate feedstock under suitable hydrodesulfurization conditions that may include the presence of hydrogen and an elevated total pressure and temperature. Such suitable reaction systems can include fixed catalyst bed systems, ebullating catalyst bed systems, slurried catalyst systems, and fluidized catalyst bed systems. The preferred reactor system is that which includes a fixed bed of the inventive catalyst contained within a reactor vessel equipped with a reactor feed inlet means, such as a feed nozzle, for introducing the distillate feedstock into the reactor vessel, and a reactor effluent outlet means, such as an effluent outlet nozzle, for withdrawing the reactor effluent or the treated hydrocarbon product or the ultra-low sulfur distillate product from the reactor vessel.

The inventive process generally operates at a hydrodesulfurization reaction pressure in the range of from 689.5 kPa (100 psig) to 13,789 kPa (2000 psig), preferably from 1896 kPa (275 psig) to 10,342 kPa (1500 psig), and, more preferably, from 2068.5 kPa (300 psig) to 8619 kPa (1250 psig).

The hydrodesulfurization reaction temperature is generally in the range of from 200° C. (392° F.) to 420° C. (788° F.), preferably, from 260° C. (500° F.) to 400° C. (752° F.), and, most preferably, from 320° C. (608° F.) to 380° C. (716° F.).

The flow rate at which the distillate feedstock is charged to the reaction zone of the inventive process is generally such as to provide a liquid hourly space velocity (LHSV) in the range of from 0.01 $hr^{-1}$ to 10 $hr^{-1}$. The term "liquid hourly space velocity", as used herein, means the numerical ratio of the rate at which the distillate feedstock is charged to the reaction zone of the inventive process in volume per hour divided by the volume of catalyst contained in the reaction zone to which the distillate feedstock is charged. The preferred LHSV is in the range of from 0.05 hr to 5 $hr^{-1}$, more preferably, from 0.1 $hr^{-1}$ to 3 $hr^{-1}$. and, most preferably, from 0.2 $hr^{-1}$ to 2 $hr^{-1}$.

It is preferred to charge hydrogen along with the distillate feedstock to the reaction zone of the inventive process. In this instance, the hydrogen is sometimes referred to as hydrogen treat gas. The hydrogen treat gas rate is the amount of hydrogen relative to the amount of distillate feedstock charged to the reaction zone and generally is in the range upwardly to 1781 $m^3/m^3$ (10,000 SCF/bbl). It is preferred for the treat gas rate to be in the range of from 89 $m^3/m^3$ (500 SCF/bbl) to 1781 $m^3/m^3$ (10,000 SCF/bbl), more preferably, from 178 $m^3/m^3$ (1,000 SCF/bbl) to 1602 $m^3/m^3$ (9,000 SCF/bbl), and, most preferably, from 356 $m^3/m^3$ (2,000 SCF/bbl) to 1425 $m^3/m^3$ (8,000 SCF/bbl).

The desulfurized distillate product yielded from the process of the invention has a low or reduced sulfur concentration relative to the distillate feedstock. A particularly advantageous aspect of the inventive process is that it is capable of providing a deeply desulfurized diesel product or an ultra-low sulfur diesel product. As already noted herein, the low sulfur distillate product can have a sulfur concentration that is less than 50 ppmw or any of the other noted sulfur concentrations as described elsewhere herein.

The following examples are presented to further illustrate the invention, but they are not to be construed as limiting the scope of the invention.

EXAMPLES

Example I

This Example describes the preparation of Catalyst A and comparison Catalyst B.

Catalyst A

Catalyst A was prepared by first forming a aqueous cobalt solution by dissolving 724.71 parts by weight cobalt nitrate ($Co(NO_3)_2.6H_2O$) in 316.4 parts by weight deionized water by heating and thereafter cooling the aqueous cobalt solution. The aqueous cobalt solution was mixed within a Muller mixer was 3134.8 parts by weight 2% silica-alumina, 680.3 parts by weight crushed fines of a fresh Co/Mo/P/Ni hydrotreating catalyst (2.9 wt % Co, 12.0 wt % Mo, 0.09 wt % P, and 0.02 wt % Ni), 301.1 parts by weigh molybdenum trioxide powder, 30 parts by weight of a commercial extrusion aid, 3465.7 parts by weight of deionized water and nitric acid. This mixture was extruded using a 1.3 mm trilobe dies. The extrudates were dried at 100° C.

Aliquot portions of the dried extrudate particles were calcined in air each for a period of two hours at a temperature of 593° C. (1100° F.) and 677° C. (1250° F.). The final calcined mixture contained 4.3 weight percent cobalt metal (5.47 wt. % as CoO), 15.3 weight percent molybdenum metal (22.95 wt. % $MoO_3$) and 0.03 weight percent phosphorous metal (0.03 wt. % as $P_2O_5$). The following Table 1 presents certain properties of the dried extrudate particles that were calcined at each of the calcinations temperatures

TABLE 1

Pore Size Distribution (% of Total Pore Volume)
Measured by Hg Porosimetry at θ = 140° and Surface Area

| Range, Angstroms | Calc. Temp 1100° F. | Calc. Temp. 1250° F. |
|---|---|---|
| Less than 50 | 1.69 | 0 |
| 50-60 | 4.88 | 0 |
| 60-70 | 11.17 | 0 |
| 70-80 | 15.54 | 0 |
| 80-90 | 13.05 | 0 |
| 90-100 | 8.29 | 0 |
| 100-110 | 4.38 | 0.05 |
| 110-120 | 2.70 | 0.15 |
| 120-130 | 1.94 | 0.26 |
| 130-140 | 1.38 | 0.39 |
| 140-150 | 1.12 | 0.78 |
| 150-160 | 0.93 | 1.67 |
| 160-170 | 0.74 | 3.03 |
| 170-180 | 0.65 | 5.24 |
| 180-210 | 1.50 | 23.55 |
| 210-280 | 2.07 | 24.79 |
| 280-350 | 1.1 | 5.27 |
| Greater than 350 | 26.87 | 34.81 |
| $N_2$ Surface Area $m^2/g$ | 311 | 263 |

Catalyst B

Catalyst B was prepared by first forming a aqueous cobalt solution by dissolving 264.9 parts by weight cobalt nitrate $(Co(NO_3)_2 \cdot 6H_2O)$ in 200 parts by weight deionized water. The aqueous cobalt solution was mixed within a Muller mixer was 3278.7 parts by weight wide pore alumina, 680.3 parts by weight crushed fines of a fresh Co/Mo/P/Ni hydrotreating catalyst (2.9 wt % Co, 12.0 wt % Mo, 0.09 wt % P, and 0.02 wt % Ni), 301.1 parts by weigh molybdenum trioxide powder, 30 parts by weight of a commercial extrusion aid, and 28.46.8 parts by weight of deionized water. This mixture was extruded using a 1.3 mm trilobe dies. The extrudates were dried at 100° C.

Aliquot portions of the dried extrudate particles were calcined in air each for a period of two hours at a temperature of 593° C. (1100° F.) and 677° C. (1250° F.). The final calcined mixture contained 2.2 weight percent cobalt metal (2.8 wt. % as CoO), 7.9 weight percent molybdenum metal (11.85 wt. % $MoO_3$) and 0.02 weight percent phosphorous metal (0.04 wt. % as $P_2O_5$). The following Table 2 presents certain properties of the dried extrudate particles that were calcined at each of the calcinations temperatures.

TABLE 2

Pore Size Distribution (% of Total Pore Volume)
Measured by Hg Porosimetry at θ = 140° and Surface Area

| Range, Angstroms | Calc. Temp 1100° F. | Calc. Temp. 1250° F. |
|---|---|---|
| Less than 50 | 2.98 | 0.81 |
| 50-60 | 7.90 | 1.43 |
| 60-70 | 15.82 | 4.21 |
| 70-80 | 22.18 | 10.01 |
| 80-90 | 20.54 | 17.85 |
| 90-100 | 10.30 | 21.78 |
| 100-110 | 4.65 | 17.15 |
| 110-120 | 2.43 | 8.09 |
| 120-130 | 1.57 | 3.87 |
| 130-140 | 1.02 | 2.09 |
| 140-150 | 0.79 | 1.37 |
| 150-160 | 0.67 | 1.02 |
| 160-170 | 0.52 | 0.75 |
| 170-180 | 0.46 | 0.63 |
| 180-210 | 1.03 | 1.27 |
| 210-280 | 1.26 | 1.48 |
| 280-350 | 0.77 | 0.87 |
| Greater than 350 | 5.11 | 5.33 |
| $N_2$ Surface Area $m^2/g$ | 318 | 256 |

Example II

This Example describes the method used in testing the catalysts described in Example I. The method provides for removal of the sulfur content of a distillate feedstock to yield a product having less than 100 ppm sulfur.

A single reactor tube system was used to conduct this test. The heating block contained a tubular 50 inch ⅝-inch ID stainless steel (317 SS) reactor that was heated by a five zone furnace. The temperature control was based on the reactor interior temperature as measured by an RTD probe running axially through the length of the reactor and situated in the center of the catalyst bed. Each of the tube reactors was loaded in a stacked bed arrangement with 50 $cm^3$ of either Catalyst A or Catalyst B. Placed at the bottom and at the top of the reactor zones were pre- and post-reactor zones that contained 6-inches of 70-80 mesh size silicon carbide particles. To improve fluid distribution and to maximize oil, catalyst, and gas contact, the catalyst was mixed with a 1:1 ratio of 70-80 mesh silicon carbide.

The catalyst bed was activated by sulfiding using the procedure as follows: hydrogen gas was introduced into the reactor at ambient pressure and a rate of 1200 SCF/(B of feed), and feed was introduced into the reactor at ambient temperature and a rate so as to provide an LHSV of 1.5 $hr^{-1}$. The feed was a straight-run diesel spiked with TNPS to a total sulfur level of ~2.5 wt. % (the properties of the feed are shown in Table 2). Once the feed broke through the bed, the catalyst temperature was incrementally raised to 450° F. at a rate of 65° F./hour, and then held at 450° F. for 4 hours. The temperature was then ramped from 450° F. to 650° F. at a rate of 50° F./hr and then held at 650° F. for 2 hours. Thereafter, the system was allowed to cool. Un-spiked feed was thereafter introduced into the reactor at a rate so as to provide an LHSV of 1.0 $hr^{-1}$ and maintained at a temperature of 400° F., and hydrogen was introduced at a rate of 1200 SCF/(B of feed) and at a total pressure of 300 psig.

The diesel feedstock charged to the reactor was from a Mayan crude oil. The distillation properties of the feedstock as determined by ASTM Method D-2887 are presented in Table 3. Table 4 presents certain other properties of the feedstock.

TABLE 3

Distillation of Feedstock

| Wt. % | Temp, ° C. (° F.) |
|---|---|
| IBP | 132 (272) |
| 10 | 236 (457) |
| 20 | 260 (500) |
| 30 | 272 (522) |
| 40 | 283 (541) |
| 50 | 291 (559) |
| 60 | 303 (577) |
| 70 | 314 (597) |
| 80 | 325 (617) |
| 90 | 342 (648) |
| FBP | 373 (704) |

TABLE 4

Other properties of the feedstock

| | |
|---|---|
| H (wt %) | 13.0390 |
| C (wt %) | 85.1020 |
| N ppm | 243 |

TABLE 4-continued

Other properties of the feedstock

| S (wt %) | 1.6500 |
|---|---|
| API | 34.4 |

After activation of the catalyst, the feedstock was charged to the reactors along with hydrogen gas. The reactors were maintained at a pressure of 300 psig, and the feedstock was charged to the reactors at a rate so as to provide a liquid hourly space velocity (LHSV) of 1.0 hr$^{-1}$, and the hydrogen was charged at a rate of 1,200 SCF/bbl. The temperatures of the reactors were fixed at either 660° F.

Figure 1:
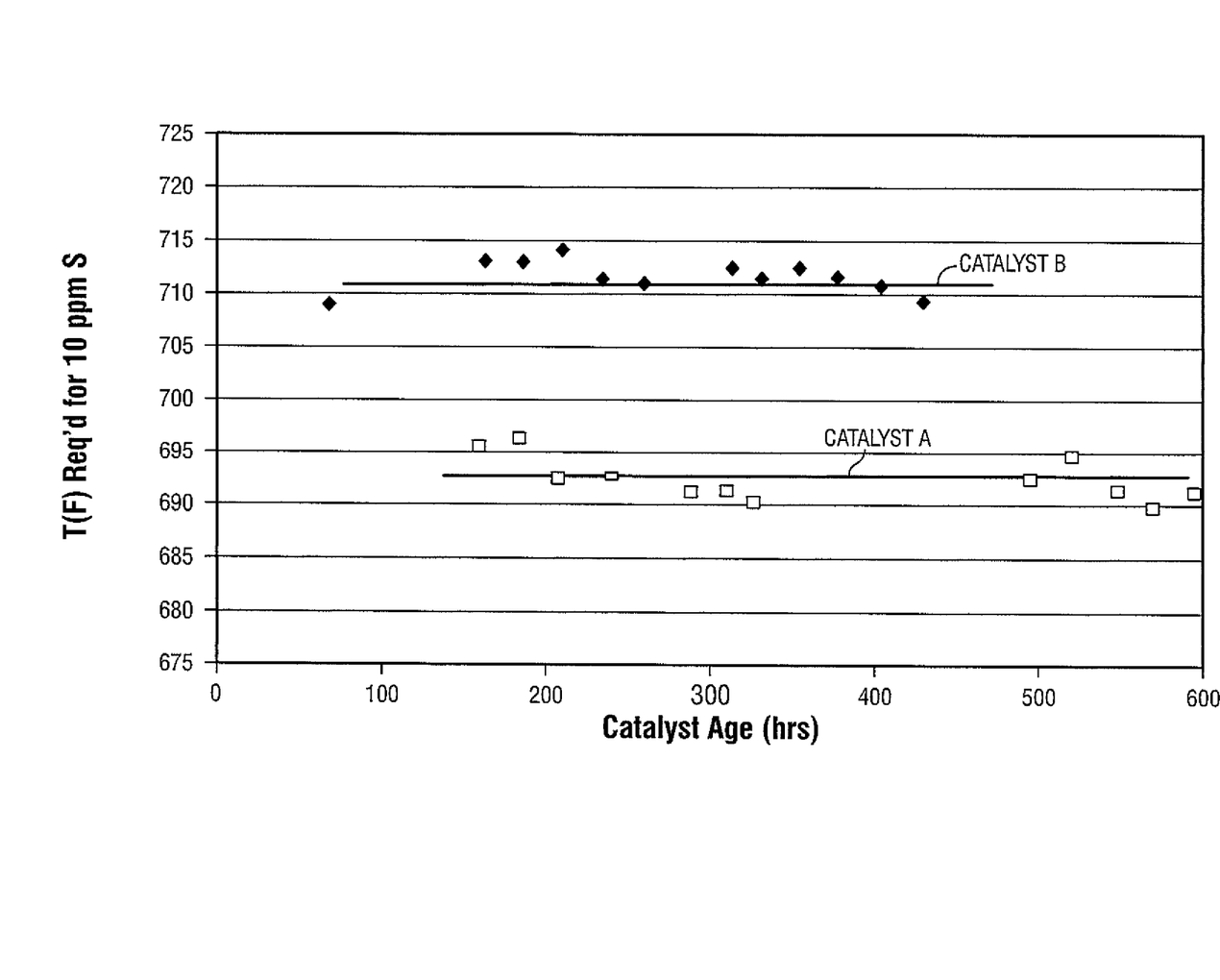
FIG. 1 presents plots of the hydrodesulfurization activity of a catalyst in accordance with the invention and that of a comparison catalyst.

Presented in FIG. 1 is a plot of the calculated Weight Average Bed Temperature (WABT) that would be required for meeting 10 ppm product sulfur content of the feedstock as a function of run time for the inventive Catalyst A and the comparison Catalyst B. As may be observed from the data presented in FIG. 1, the inventive Catalyst A exhibits catalytic activity over time that is significantly higher than the activity of the comparison Catalyst.

That which is claimed is:

1. A composition for use as a distillate hydrodesulfurization catalyst in the manufacture of an ultra-low sulfur distillate product, wherein said composition comprises: a calcined mixture made by calcining a co-mulled mixture comprising an inorganic oxide material, molybdenum trioxide in the form of finely defined particles having a maximum dimension of less than 150 mm, and a Group VIII metal compound selected from the group consisting of a nickel compound and a cobalt compound, wherein said calcined mixture has a molybdenum content in the range of from 10 weight percent to 22 weight percent with the weight percent being based upon the molybdenum as metal and the total weight of said calcined mixture, and a Group VIII metal content in the range of from 3 weight percent to 12 weight percent with the weight percent being based upon the Group VIII metal in its elemental form and the total weight of said calcined mixture, wherein said calcined mixture has a pore structure that includes a pore size distribution for said calcined mixture such that at least 70% of the total pore volume of said calcined mixture is in the pores of said calcined mixture having a diameter in the range of from 70 A to 150 A, wherein said calcined mixture has a mean pore diameter in the range of from 50 angstroms to 100 angstroms, and wherein said calcined mixture has less than 1 percent of the total pore volume in macropores having a pore diameter greater than 1000 angstroms, said calcined mixture being further characterized by having said molybdenum content and Group VIII metal content substantially uniformly dispersed within said inorganic oxide material, wherein crushed fines of a fresh, promoted, tri-metallic hydrotreatinq catalyst are mixed by co-mullinq with said inorganic oxide material and said finely divided particles of molybdenum trioxide prior to calcination of said co-mulled mixture.

2. A composition as recited in claim 1, wherein said pore structure is such that the mean pore diameter of the pores of said calcined mixture is in the range of from 60 angstroms to 95 angstroms.

3. A composition as recited in claim 2, wherein said pore structure is such that the total pore volume of said calcined mixture in macropores having pore diameters greater than 350 angstroms is less than 4.5 percent of the total pore volume.

4. A composition as recited in claim 3, wherein said calcined mixture has a surface area that exceeds 250 m$^2$/g.

5. A composition as recited in claim 4, wherein said inorganic oxide material in said calcined mixture is present in an amount in the range of from 50 to 90 weight percent of said calcined mixture and said inorganic oxide material is selected from the group consisting of alumina, silica and silica-alumina.

6. A composition as recited in claim 5, wherein said molybdenum content is in the range of from 10 weight percent to 20 weight percent, wherein said Group VIII metal content is in the range of from 4 weight percent to 11 weight percent, and wherein said Group VIII metal component is selected from the group compounds consisting of nickel compounds and cobalt compounds.

7. A composition as recited in claim 6, wherein said pore structure is such that less than 0.8 percent of the total pore volume of said calcined mixture is contained within its macropores having a diameter greater than 1000 Å.

8. A composition as recited in claim 7, wherein said molybdenum trioxide of said mixture is in a finely divided state of particulate molybdenum trioxide either as a finely divided powdered solid or as a suspension wherein said particulate molybdenum trioxide has a maximum dimension of less than 100 μm.

9. A composition as recited in claim 8, wherein said mixture contains a substantial absence of less than 2 weight percent, based on the total dry weight of said mixture, of a molybdenum compound in a form other than as molybdenum trioxide.

10. A composition as recited in claim 9, wherein said pore structure is such that the mean pore diameter of the pores of said calcined mixture is in the range of from 60 Å to 95 Å; wherein said pore structure is such that the total pore volume within the macropores of said calcined mixture having a diameter greater than 350 angstroms is less than 4 percent of the total pore volume; wherein said calcined mixture has a surface area that exceeds 275 m$^2$/g; wherein said inorganic oxide material in said calcined mixture is present in an amount in the range of from 55 to 88 weight percent of said calcined mixture and said inorganic oxide material is selected from the group consisting of alumina, silica and silica-alumina; wherein said molybdenum content is in the range of from 12 weight percent to 18 weight percent, wherein said Group VIII metal content is in the range of from 4.5 weight percent to 10.5 weight percent, and wherein said Group VIII metal component is selected from the group of compounds consisting of nickel compounds and cobalt compounds; wherein said pore structure is such that less than 0.9 percent of the total pore volume of said calcined mixture is contained within its macropores having a diameter greater than 1000 Å; wherein said molybdenum trioxide of said mixture is in a finely divided state of particulate molybdenum trioxide either as a finely divided powdered solid or as a suspension wherein said particulate molybdenum trioxide has a maximum dimension of less than 150 μm; and wherein said mixture contains a substantial absence of less than 1 weight percent, based on the total dry weight of said mixture, of a molybdenum compound in a form other than as molybdenum trioxide.

11. A composition as recited in claim 1, wherein said co-mulled mixture comprises a solid inorganic oxide starting material.

12. A composition as recited in claim 1, wherein said fresh, promoted tri-metallic hydrotreating catalyst comprises cobalt, nickel and molybdenum.

13. A composition for use as a distillate hydrodesulfurization catalyst in the manufacture of an ultra-low sulfur distillate product, wherein said composition comprises: a calcined mixture made by calcining a mixture comprising a substantial absence of a molybdenum compound that is in a form other than molybdenum trioxide and further comprising a co-mulled mixture of an inorganic oxide material, molybdenum trioxide in the form of finely defined particles having a maximum dimension of less than 150 µm, and a Group VIII metal compound selected from the group consisting of a nickel compound and a cobalt compound, wherein said calcined mixture has a molybdenum content in the range of from 10 weight percent to 22 weight percent with the weight percent being based upon the molybdenum as metal and the total weight of said calcined mixture, and a Group VIII metal content in the range of from 3 weight percent to 12 weight percent with the weight percent being based upon the Group VIII metal in its elemental form and the total weight of said calcined mixture, wherein said calcined mixture has a pore structure that includes a pore size distribution for said calcined mixture such that at least 70% of the total pore volume of said calcined mixture is in the pores of said calcined mixture having a diameter in the range of from 70 Å to 150 Å, wherein said calcined mixture has a mean pore diameter in the range of from 50 angstroms to 100 angstroms, and wherein said calcined mixture has less than 1 percent of the total pore volume in macropores having a pore diameter greater than 1000 angstroms, said calcined mixture being further characterized by having said molybdenum content and Group VIII metal content substantially uniformly dispersed within said inorganic oxide material, wherein crushed fines of a fresh, promoted, tri-metallic hydrotreating catalyst are mixed by co-mulling with said inorganic oxide material and said finely divided particles of molybdenum trioxide prior to calcination of said co-mulled mixture.

14. A composition as recited in claim 13, wherein said pore structure is such that the mean pore diameter of the pores of said calcined mixture is in the range of from 60 angstroms to 95 angstroms.

15. A composition as recited in claim 14, wherein said pore structure is such that the total pore volume of said calcined mixture in macropores having pore diameters greater than 350 angstroms is less than 4.5 percent of the total pore volume.

16. A composition as recited in claim 15, wherein said calcined mixture has a surface area that exceeds 250 m²/g.

17. A composition as recited in claim 16, wherein said inorganic oxide material in said calcined mixture is present in an amount in the range of from 50 to 90 weight percent of said calcined mixture and said inorganic oxide material is selected from the group consisting of alumina, silica and silica-alumina.

18. A composition as recited in claim 17, wherein said molybdenum content is in the range of from 10 weight percent to 20 weight percent, wherein said Group VIII metal content is in the range of from 4 weight percent to 11 weight percent, and wherein said Group VIII metal component is selected from the group compounds consisting of nickel compounds and cobalt compounds.

19. A composition as recited in claim 18, wherein said pore structure is such that less than 0.8 percent of the total pore volume of said calcined mixture is contained within its macropores having a diameter greater than 1000 Å.

20. A composition as recited in claim 19, wherein said substantial absence of a molybdenum compound in a form other than as molybdenum trioxide is less than 2 weight percent, based on the total dry weight of said mixture.

21. A composition as recited in claim 20, wherein said pore structure is such that the mean pore diameter of the pores of said calcined mixture is in the range of from 60 Å to 95 Å; wherein said pore structure is such that the total pore volume within the macropores of said calcined mixture having a pore diameter greater than 350 angstroms is less than 4 percent of the total pore volume; wherein said calcined mixture has a surface area that exceeds 275 m²/g; wherein said inorganic oxide material in said calcined mixture is present in an amount in the range of from 55 to 88 weight percent of said calcined mixture and said inorganic oxide material is selected from the group consisting of alumina, silica and silica-alumina; wherein said molybdenum content is in the range of from 12 weight percent to 18 weight percent, wherein said Group VIII metal content is in the range of from 4.5 weight percent to 10.5 weight percent, and wherein said Group VIII metal component is selected from the group of compounds consisting of nickel compounds and cobalt compounds; wherein said pore structure is such that less than 0.9 percent of the total pore volume of said calcined mixture is contained within its macropores having a diameter greater than 1000 Å; and wherein in said mixture said substantial absence is less than 1 weight percent.

22. A composition for use as a distillate hydrodesulfurization catalyst in the manufacture of an ultra-low sulfur distillate product, wherein said composition comprises: a calcined mixture made by calcining a co-mulled mixture consisting essentially of a solid inorganic oxide starting material, molybdenum trioxide in the form of finely defined particles having a maximum dimension of less than 150 µm, and a Group VIII metal compound selected from the group consisting of a nickel compound and a cobalt compound, wherein said calcined mixture has a molybdenum content in the range of from 10 weight percent to 22 weight percent with the weight percent being based upon the molybdenum as metal and the total weight of said calcined mixture, and a Group VIII metal content in the range of from 3 weight percent to 12 weight percent with the weight percent being based upon the Group VIII metal in its elemental form and the total weight of said calcined mixture, wherein said calcined mixture has a pore structure that includes a pore size distribution for said calcined mixture such that at least 70% of the total pore volume of said calcined mixture is in the pores of said calcined mixture having a diameter in the range of from 70 Å to 150 Å, wherein said calcined mixture has a mean pore diameter in the range of from 50 angstroms to 100 angstroms, and wherein said calcined mixture has less than 1 percent of the total pore volume in macropores having a pore diameter greater than 1000 angstroms, said calcined mixture being further characterized by having said molybdenum content and Group VIII metal content substantially uniformly dispersed in said inorganic oxide material, wherein crushed fines of a fresh, promoted, tri-metallic hydrotreating catalyst are mixed by co-mulling with said inorganic oxide material and said finely divided particles of molybdenum trioxide prior to calcination of said co-mulled mixture.

23. A composition as recited in claim 22, wherein said pore structure is such that the mean pore diameter of the pores of said calcined mixture is in the range of from 60 angstroms to 95 angstroms.

24. A composition as recited in claim 23, wherein said pore structure is such that the total pore volume of said calcined mixture in macropores having diameters greater than 350 angstroms is less than 4.5 percent of the total pore volume.

25. A composition as recited in claim 24, wherein said calcined mixture has a surface area that exceeds 250 m²/g.

26. A composition as recited in claim 25, wherein said inorganic oxide material in said calcined mixture is present in an amount in the range of from 50 to 90 weight percent of said calcined mixture and said inorganic oxide material is selected from the group consisting of alumina, silica and silica-alumina.

27. A composition as recited in claim 26, wherein said molybdenum content is in the range of from 10 weight percent to 20 weight percent, wherein said Group VIII metal content is in the range of from 4 weight percent to 11 weight percent, and wherein said Group VIII metal component is selected from the group of compounds consisting of nickel compounds and cobalt compounds.

28. A composition as recited in claim 27, wherein said pore structure is such that less than 0.8 percent of the total pore volume of said calcined mixture is contained within its macropores having a diameter greater than 1000 Å.

29. A composition as recited in claim 28, wherein said molybdenum trioxide of said mixture is in a finely divided state of particulate molybdenum trioxide either as a finely divided powdered solid or as a suspension wherein said particulate molybdenum trioxide has a maximum dimension of less than 100 μm.

30. A composition as recited in claim 29, wherein said mixture contains a substantial absence of less than 2 weight percent, based on the total dry weight of said mixture, of a molybdenum compound in a form other than as molybdenum trioxide.

31. A composition as recited in claim 30, wherein said mixture further consists essentially of a promoter component selected from the group of phosphorous compounds.

32. A composition as recited in claim 31, wherein said pore structure is such that the mean pore diameter of the pores of said calcined mixture is in the range of from 60 Å to 95 Å; wherein said pore structure is such that the total pore volume within the macropores of said calcined mixture having a pore diameter greater than 350 angstroms is less than 4 percent of the total pore volume; wherein said calcined mixture has a surface area that exceeds 275 $m^2/g$; wherein said inorganic oxide material in said calcined mixture is present in an amount in the range of from 55 to 88 weight percent of said calcined mixture and said inorganic oxide material is selected from the group consisting of alumina, silica and silica-alumina; wherein said molybdenum content is in the range of from 12 weight percent to 18 weight percent, wherein said Group VIII metal content is in the range of from 4.5 weight percent to 10.5 weight percent, and wherein said Group VIII metal component is selected from the group of compounds consisting of nickel compounds and cobalt compounds; wherein said pore structure is such that less than 0.9 percent of the total pore volume of said calcined mixture is contained within its macropores having a diameter greater than 1000 Å; wherein said molybdenum trioxide of said mixture is in a finely divided state of particulate molybdenum trioxide either as a finely divided powdered solid or as a suspension wherein said particulate molybdenum trioxide has a maximum dimension of from 0.5 to 75 μm; and wherein said mixture contains a substantial absence of less than 1 weight percent, based on the total dry weight of said mixture, of a molybdenum compound in a form other than as molybdenum trioxide.

33. A composition as recited in claim 32, wherein at least 50 percent of said particulate molybdenum trioxide has a maximum dimension in the range of from 2 to 15 μm.

34. A composition as recited in claim 22, wherein said molybdenum content is in the range of from 14 weight percent to 16 weight percent, based upon the molybdenum as metal and the total weight of said composition.

35. A composition as recited in claim 22, wherein said fresh, promoted tri-metallic hydrotreating catalyst comprises cobalt, nickel and molybdenum.

* * * * *